United States Patent [19]

Piber

[11] 4,005,300
[45] Jan. 25, 1977

[54] PANEL MOUNTED DEVICE INCLUDING PRESS-IN RETENTION MEANS

[75] Inventor: Earl T. Piber, Oconomowoc, Wis.

[73] Assignee: Cutler-Hammer, Inc., Milwaukee, Wis.

[22] Filed: May 27, 1975

[21] Appl. No.: 580,625

[52] U.S. Cl. .......................... 200/296; 174/153 G; 248/27.1; 339/128
[51] Int. Cl.² ........................................ H01H 9/00
[58] Field of Search ............. 248/27 R; 200/159 R, 200/340, 153 G, 295, 296, 297, 339; 174/53, 153 G; 339/126 R, 128

[56] References Cited

UNITED STATES PATENTS

| | | | |
|---|---|---|---|
| 2,779,833 | 1/1957 | Farison | 200/296 |
| 3,424,414 | 1/1969 | Horwitt | 248/27 R |
| 3,768,115 | 10/1973 | Hoffmann | 174/153 G |

*Primary Examiner*—Gerald P. Tolin
*Attorney, Agent, or Firm*—Michael, Best & Friedrich

[57] ABSTRACT

An electrical toggle switch assembly adapted for mounting from the rear of a bulkhead or support panel includes a bushing which pivotally supports an actuating lever and is inserted into a mounting hole in the panel. Secured on the outer peripheral surface of the bushing is a retainer made from an oriented fiber material including a plurality of short, relatively stiff, normally straight fibers which slant downwardly at an acute angle, preferably less than 45°, and normally extend outwardly from the bushing beyond the inner periphery of the panel mounting hole. As the bushing is pressed through the mounting hole, the fibers are deflected inwardly and a portion thereafter spring back to their normally extended position and grip the front of the panel in the area surrounding the mounting hole to hold the switch assembly on the panel.

5 Claims, 6 Drawing Figures

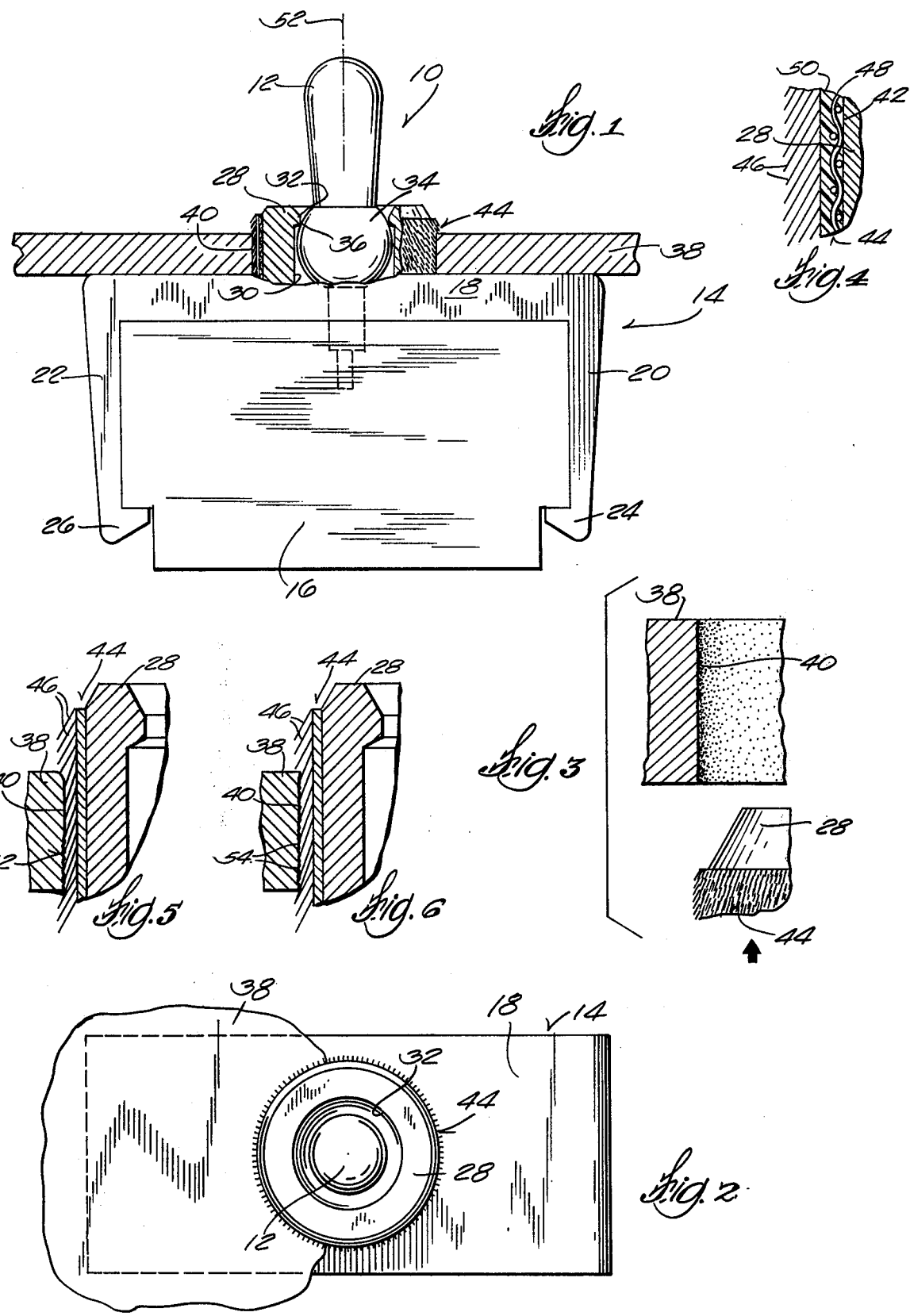

PANEL MOUNTED DEVICE INCLUDING PRESS-IN RETENTION MEANS

BACKGROUND OF THE INVENTION

This invention relates to panel mounted devices, such as electrical switches and the like, and more particularly to such a device having a press-in means for retaining the device on the panel.

It is known to provide panel mounted devices, such as switches and other electrical components, with a snap-in or press-in retention means which, upon insertion of a portion of the device through a mounting hole in a bulkhead or support panel, automatically locks the device onto the panel. Prior retention means typically employ biased fingers or the like which are released and grip the edge or rim of the mounting hole when the device is pressed into the mounting hole. While generally acceptable for their intended purpose, prior pressin retention means usually require relatively complex fabrication, assembly and/or mounting operations.

SUMMARY OF THE INVENTION

A primary object of the invention is to provide a panel mounted device, such as an electrical switch or the like, having a simple and inexpensive press-in retention means.

Another object of the invention is to provide a press-in retention means for a panel mounted device which permits the device to be quickly and easily installed through a hole in a support panel and from the rear of the panel without special tools.

Other objects, aspects and advantages of the invention will become apparent upon reviewing the following detailed description, the drawing and the appended claims.

The mounting arrangement provided by the invention includes an elongated bushing, which is to be inserted through the aperture of a support panel and carries a part to be accessible from the front of the panel, and an oriented fiber retainer secured to the outer peripheral surface of the bushing. The retainer includes a backing material and a plurality of stiff, normally straight fibers having one end secured at spaced locations to the backing material and extending outwardly and downwardly from the outer surface of the backing material at an acute angle, with the free ends thereof normally extending beyond the inner periphery of the panel mounting hole. During mounting, the retainer fibers engage the inner wall of the panel mounting hole and are deflected inwardly to permit the outer portion of the bushing to be pressed through the hole. After passing through the panel mounting hole, a portion of the fibers spring back to their normally extended position and abut the front of the panel in the area surrounding the hole. The resistance of the extended, downwardly angled fibers to deflect under compression holds the device on the panel.

BRIEF DESCRIPTION OF THE DRAWING

FIG. 1 is an enlarged, side elevational view, partially broken away, of a one-hole-mounted, press-in toggle switch assembly embodying various of the features of the invention shown mounted on a bulkhead or support panel.

FIG. 2 is a top plan view, partially broken away, of the toggle switch assembly shown in FIG. 1.

FIG. 3 is an enlarged, fragmentary view of the bushing and the retainer of the toggle switch assembly of FIG. 1 shown in a position ready for installation of the toggle switch assembly from the rear of the support panel.

FIG. 4 is an enlarged, fragmentary, sectional view of the bushing and retainer.

FIG. 5 is an enlarged, fragmentary view of a switch assembly mounted in a panel mounting hole formed by punching.

FIG. 6 is an enlarged, fragmentary view of a switch assembly mounted in a panel mounting hole formed by drilling.

DESCRIPTION OF THE PREFERRED EMBODIMENT

Illustrated in the drawing is a toggle switch assembly 10 embodying various of the features of the invention. The toggle switch assembly 10 includes a toggle lever 12, a switch frame 14 and an insulating switch base 16 which houses electrical contacts (not shown). The toggle lever 12 and the switch base 16 are of conventional design so a detailed illustration and description of the structural features thereof is not necessary for a full understanding of the invention. For example, the Miller U.S. Pat. No. 3,146,330, issued Aug. 25, 1964, discloses a toggle switch assembly including a toggle lever and switch base arrangement adaptable for use in the invention.

The switch frame 14 of metal or thermoplastic has a generally rectangular top 18 and a pair of depending legs 20 and 22, one at each end, for hugging the switch base 16. Located on the lower end of each leg 20 and 22 is a respective inwardly-directed hook 24 and 26 which snaps into a notch provided in the switch base to secure the switch frame on the switch base with the top of the switch frame covering the open top of the switch base.

In the specific construction illustrated, an elongated bushing 28, formed as an integral part of the switch frame 14, extends outwardly from the top of the switch frame coaxially with a circular aperture 30 provided in the switch frame. The bushing 28 has a central bore 32 for receiving the toggle lever 12. The toggle lever 12 has an external handle and extends through the bushing 28 with the lower end thereof extending into the switch base 16 for actuation of the switch contacts, for example, as disclosed in the above-identified Miller patent. The toggle lever 12 also includes an enlarged spherical portion 34 which bears against a constricted portion 36 of the bushing bore 32 to afford pivotal movemwnt of the toggle lever relative to the bushing during actuating movement.

The bushing 28 has an axial dimension greater than the thickness of the bulkhead or support panel 38 on which the switch assembly 10 is to be mounted from the rear. The mounting hole 40 in the panel 38, through which the bushing 28 is inserted for mounting, can be circular, square, rectangular or various other shapes. The outer peripheral surface 42 of the bushing 28 has a cross-sectional configuration substantially the same as the mounting hole 40 but has an outer dimension smaller than the inner dimension of the mounting hole so as to accommodate an oriented fiber retainer 44 secured to the outer peripheral surface of the bushing.

The retainer 44 is made from an oriented fiber material including a plurality of relatively short, stiff and normally straight fibers 46 which slant downwardly so that a portion thereof grips the front of the panel around the panel mounting hole 40 after the bushing 28 has been pressed thereinto as shown in FIG. 1. As best shown in FIG. 4, the retainer 44 preferably includes a flexible fabric backing 48, such as an open web cotton fabric, and an adhesive layer 50 which covers the outer face of the backing 48 and in which one end of each fiber 46 is embedded. The fibers 46, which preferably are of substantially uniform denier and length and are randomly spaced on the backing 48, may be synthetic, semisynthetic, regenerated or natural fibers as long as they are sufficiently stiff to provide a tight gripping action on the inside walls of mounting hole 40 and the front of the panel 38 as explained below. For example, the fibers made from nylon of about 10–500 denier per filament and a length of about 0.2 to 1 mm are acceptable.

The inner face of the backing 48 preferably substantially encircles the outer peripheral surface 42 of the bushing 28 and is suitable secured thereto, such as with an adhesive. The retainer 44 can be installed as a preformed sleeve which is slipped over the bushing or as a strip which is wrapped around the outer periphery of the bushing. Such a strip of material can be rectangularly shaped or have diagonally extending, adjoining ends.

When the retainer 44 is installed on the bushing 28, each fiber 46 extends from the outer surface of the backing 48 in a plane generally perpendicular to the outer surface of the bushing at the location of the secured end of the fiber and downwardly in a direction away from the outer end of the bushing at an acute angle, preferably less than 45°, to the outer surface of the bushing. For instance, if the bushing 28 has a circular cross section, each fiber 46 extends from the outer surface of the bushing in a plane generally perpendicular to a line intersecting the secured end of the fiber and tangent to the outer surface of the bushing and at an angle less than 45° to a straight line extending axially along the outer surface of the bushing and generally parallel to the longitudinal axis of the bushing (represented by dashed line 52 in FIG. 1). As shown in FIG. 3, when the fibers 46 are in their normally extended position, the free ends thereof extend outwardly beyond the inner periphery of the panel mounting hole 40.

Upon pressing the bushing 28 into the panel mounting hole 40 (in the direction of the arrow in FIG. 3), the fibers 46 engage the inner wall of the panel mounting hole 40 and are deflected inwardly to permit the bushing to be pressed through the hole. A portion of the fibers 46 located near the outer end of the bushing 28, spring back to their normally extended position and their free ends bear against the front of the panel and grip the panel in the area surrounding the panel mounting hole 40. The resistance of the downwardly slanting fibers 46 to deflect under compression, i.e., in an axial direction away from the back of the panel, serves to lock the switch assembly 10 on the panel 38. The inner wall of the panel hole 40 is normally roughened and provides frictional resistance on the deflected fibers located within the hole, thereby enhancing the gripping force provided by the retainer 44.

For instance, when the panel mounting hole 40 is formed by a punching or piercing operation as shown in FIG. 5, the inner end portion 52 (i.e., the break portion) of the mounting hole normally has a roughened surface. A portion of the deflected fibers 46 inside the hole grip this roughened surface as illustrated. Similarly, when the panel mounting hole 40 is formed by drilling as shown in FIG. 6, the entire inner surface of the mounting hole includes a plurality of annular grooves 54 made by the rotating drill bit. The deflected fibers 46 inside the hole grip these grooves as illustrated.

When the bushing 28 has a circular cross section, the panel mounting hole 40 can be provided with a key or lug (not shown) which fits into an axially extending keyway (not shown) provided along one side of the bushing in order to afford proper indexing of the switch assembly 10 and/or to prevent the switch assembly from rotating relative to the panel after mounting. In this case, a strip of the oriented fiber material is used with the opposite ends thereof located adjacent the opposite edges of the keyway in the bushing.

While the preferred embodiment of the invention has been illustrated and described in detail, it will be apparent to those skilled in the art that various changes and modifications can be made thereto to adapt the invention to various uses without departing from the scope of the appended claims.

I claim:

1. A mounting arrangement for a device adapting the device to be mounted from the back of and through an aperture in a support panel to secure the device on the panel so that a part of the device is accessible from the front of the panel comprising an elongated bushing carrying the accessible part of the device, having an axial length greater than the thickness of the panel and having an outer end portion adapted to be inserted through the panel aperture; and a retainer mounted on said bushing end portion, said retainer including a supporting material secured to the outer peripheral surface of said bushing end portion and carrying a plurality of stiff, normally straight fibers having one end secured at spaced locations to said supporting material, each of said fibers extending from the outer surface of said supporting material in a plane generally perpendicular to the outer peripheral surface of said bushing at the location of said secured end and downwardly in a direction away from the outer end of said bushing at an acute angle with the free ends of said fibers normally extending outwardly beyond the inner periphery of the panel aperture, whereby said fibers, upon engagement with the inner wall of the panel aperture, can be deflected inwardly to permit the outer end portion of said bushing to be pressed through the panel aperture and a portion of said fibers thereafter will return to their normally extended position and grip the front of the panel in the area surrounding the panel aperture to lock the device on the panel.

2. A mounting arrangement according to claim 1 wherein said angle is less than 45°.

3. A mounting arrangement according to claim 2 wherein said supporting material includes a strip of flexible fabric material of uniform thickness and a layer of an adhesive material covering said fabric material; and said secured ends of said fibers are embedded in said layer of adhesive material.

4. A mounting arrangement according to claim 2 wherein each of said fibers is between about 10 to about 500 denier and has a length between about 0.2 and about 1 mm.

5. A toggle switch adapted to be mounted in an aperture in a support panel and including a base housing switch contacts and a pivotable toggle lever for actuating said contacts comprising
- a switch frame mounted on said switch base and having a top surface;
- an elongated bushing pivotally supporting said toggle lever and extending outwardly from said top of said switch frame, said bushing having an axial-length greater than a thickness of the panel and an outer end portion adapted to be inserted into the panel aperture; and
- a retainer mounted on said bushing outer end portion, said retainer including a flexible supporting material secured to said outer peripheral surface of said bushing end portion and carrying a plurality of stiff, normally straight fibers having one end secured at spaced locations to said supporting material, each of said fibers extending from the outer surface of said supporting material in a plane generally perpendicular to said outer peripheral surface of said bushing at the location of said secured end and downwardly in a direction away from the outer end of said bushing at an angle less than 45°, said fibers extending generally equal distances from the outer peripheral surface of said bushing with the free ends thereof normally extending outwardly beyond the inner periphery of the panel aperture, whereby said fibers, upon engagement with the inner wall of the panel aperture, can be deflected inwardly to permit the outer end portion of said bushing to be pressed through the panel aperture and a portion of said fibers thereafter will return to their normally extended position and grip the front of the panel in the area surrounding the panel aperture to lock the device on the panel.

* * * * *